July 19, 1927.  
J. BERGSTEN  
HOOK  
Original Filed Jan. 22, 1923
1,636,209
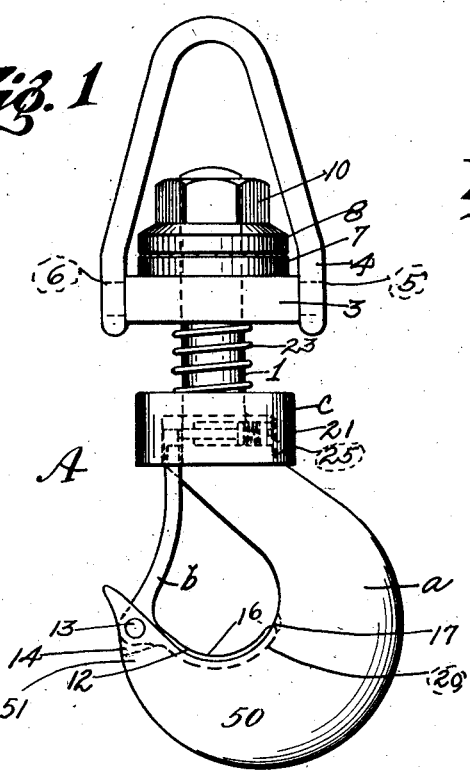
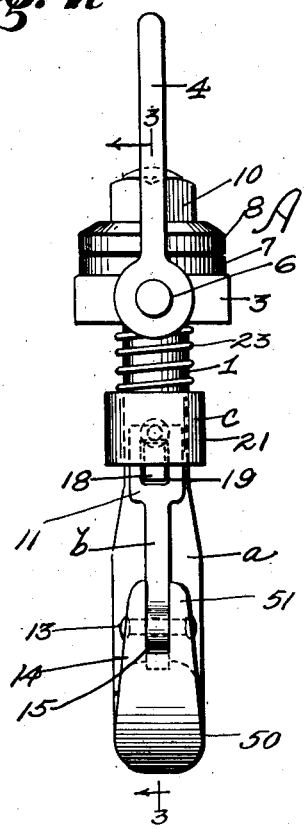
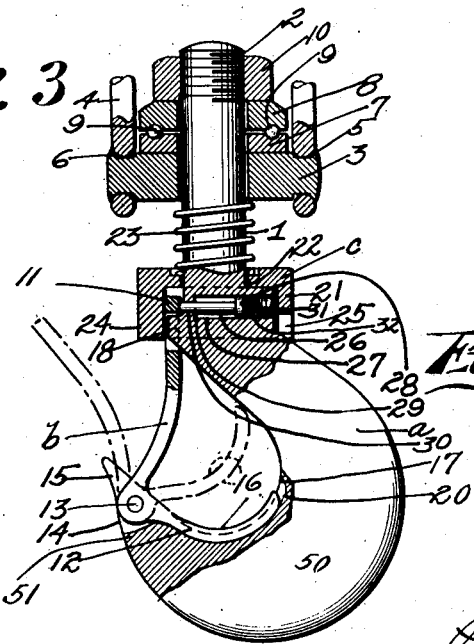
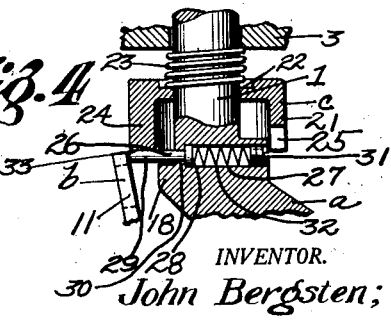
INVENTOR.  
John Bergsten;  
BY Blakeslee & Brown  
ATTORNEYS.

Patented July 19, 1927.

1,636,209

UNITED STATES PATENT OFFICE.

JOHN BERGSTEN, OF REDONDO BEACH, CALIFORNIA, ASSIGNOR, BY MESNE ASSIGNMENTS, TO STANDARD MACHINE COMPANY, A CORPORATION OF CALIFORNIA.

HOOK.

Application filed January 22, 1923, Serial No. 614,084. Renewed November 22, 1924.

This invention relates to hooks and has particular reference to that type of a hook in which there is a closure for retaining objects in the hook so that they will not accidentally drop or become displaced therefrom.

Although my invention is applicable to hooks of various sizes and for various uses, it is particularly desirable for hooks in well drilling rigs. I have in this application set forth my invention as applied to, and in a form suited for, hooks of the class just mentioned, it being understood that this disclosure is not to be considered as limiting the use and application of this invention.

It is an object of this invention to provide a hook in which the nose or outer portion is effectively held against being sprung or pulled down by the load on the hook.

It is another object of this invention to provide a hook of the type above referred to in which the closure operates as a tie between the nose portion and shank as well as to retain objects in the hook.

It is a further object of my invention to provide a simple, effective means for holding or retaining the closure in closed position.

The various objects and features of my invention will be best and more fully understood from the following detailed description of a typical form and application of the invention throughout which description reference is had to the accompanying drawings in which Fig. 1 is a side elevation of a hook embodying the present invention.

Fig. 2 is a front elevation of the hook.

Fig. 3 is a sectional view of the hook taken in the same direction as Fig. 1 being a view taken as indicated by line 3—3 on Fig. 1 and Fig. 4 is a detailed sectional view showing a portion of the parts shown in Fig. 3 in another position.

In the drawings the hook embodying the present invention is designated as an entirety and in one embodiment by A, the hook being within that class known as swiveled hooks; that is to say, the hook includes the usual hook part proper and a swiveled supporting means or mounting for the hook part proper. The swiveled support shown in the drawings includes a stem 1 extending upwardly from the hook proper, a collar 3 rotatably carried on the stem, a bail 4 pivotally carried on trunnions 6 extending from diametrically opposite sides of the collar 3, a nut 10 screw-threaded on the upper end of the stem to retain the collar thereon and a suitable thrust bearing arranged between the nut and collar. The thrust bearing may comprise bearing rings 7 and 8 arranged on the stem between the nut and collar and separated by ball bearings 9 or other anti-friction means. The hook proper may be of the more or less usual form and construction comprising a load carrying part 50, a shank or body part $a$ extending upwardly from one end part 50 and an outer part or nose 51 extending from the other end of the part 50. The parts 50, 51 and $a$ are preferably formed integrally and together form a hook shaped structure such, for instance, as I have shown throughout the drawings. The stem 1 may be formed with and as a part of the shank of the hook. The construction just described is more or less common to hooks and has no direct relation to the present invention.

My present invention provides a closure $b$ for the opening of the hook, that is, to extend between the nose portion 51 and shank $a$ to retain objects in the hook, and means $c$ for locking or releasably holding the closure $b$ in a closed position. The closure is pivotally connected to one part of the hook and is adapted to be swung or moved into or out of position at the other part of the hook. In the drawings I have illustrated the closure as pivotally connected to the nose portion of the hook and have shown the nose portion of the hook bifurcated at 15 to receive the closure. The closure is pivotally mounted in the bifurcation on a pivot pin 13. With the closure $b$ thus pivotally connected with the nose portion of the hook the outer or upper portion of the closure is adapted to swing into and out of position at the shank. In Fig. 3 of the drawings the closure is shown in full lines in the closed position and is shown in dotted lines in a partially open position. An actuating member or trigger 16 is provided in association with the closure to be engaged by an object being arranged in the hook to cause swinging or actuating of the closure to the closed position. The trigger 16 may be in the form of an arm or projection on the closure adapted to set in a recess 20 in the load carrying part 50 of the hook when the closure is in the closed position and to extend or project into the open portion of the hook when the closure is open. When the trigger is held in or to the load carrying part 50 by an object in the hook the closure is of course, held closed. The trigger is rigid, preferably integral, with the closure so that the two work together. The trigger is, of course, preferably shaped and finished so that it sets firmly in the recess 20 provided in the load carrying part 50 and thus virtually forms or acts as a part of the load carrying part 50.

With the particular form and relationing of parts shown in the drawings the outer or upper end of the closure $b$ extends to or is at the upper end portion of the shank $a$ when in the closed position. The hook is further so shaped and proportioned that the upper end portion of the shank $a$ is directly above the load carrying portion 50 and the closure $b$ is in a substantially vertical position when closed. The desirability of this positioning of the closure will be apparent from the description to follow. My present invention provides interengaging means between the outer part of the closure and the shank $a$ so that the closure and shank are connected, when the closure is in closed position, so that load or strain is transmitted between them. In the form of the invention herein set forth the interengaging means comprises a lug or projection 18 on one of the parts, for instance, the shank $a$ and a cooperating head 11 on the outer end of the closure $b$. The head 11 is in the form of an enlargement on the outer end of the closure having an opening 19 adapted to receive the projection 18. The projection and head are so proportioned and related that the projection is received in the opening of the head when the closure is in the closed position and is such that the outer part of the closure is connected with the shank so that the closure forms a tie between the shank and nose of the hook. In other words the closure extends between the nose portion and shank in a manner to operate under tension to resist any stress or movement tending to bend or open out the hook.

The locking means $c$ provided for releasably holding the closure in the closed position cooperates with or supplements the action of the trigger in holding the closure in closed position so that objects cannot escape from the hook. The locking means in accordance with the broader aspects of my invention may include a part 21 carried by the hook proper, for instance, at the upper end of the shank portion of the hook to be moved into and out of position where it operates to retain the closure in the closed position where the head of the closure is in cooperative engagement with the projection 18. In the particular form of the invention illustrated in the drawings the part 21 is connected with the hook proper to reciprocate into and out of engagement with the head 11 of the closure. The part 21 is shown in the form of a sleeve having a portion 22 slidably carried on the stem 1 and a flange portion 24 slidably fitting over the upper end portion of the shank $a$. The portion 24 is the portion of the part 21 which engages and holds the head of the closure. The invention provides means for normally yieldingly holding the part 21 in position with the part 24 thereof engaging the closure to hold it in the closed position. This means may comprise a spring 23, for instance, a helical spring 23 carried on the stem between the collar 3 of the swivel support and the part 21 in the manner clearly shown throughout the drawings. In the particular form of construction illustrated in the drawings the portion 24 of the part 21 is cut away at 25 to receive a part of the shank $a$, which might otherwise interfere with the operation of the part 21. With the construction just described the part 21 is normally yieldingly held in a down position where the portion 24 extends over and holds the head 11 of the closure in cooperative engagement on the shank. When it is desired to release the closure the part 21 must be slid or moved upwardly against the resistance of the spring 23 until the portion 24 passes above the head 11 to free it. Upon releasement of the part 21 the spring 23 tends to immediately return it to a down position. It may be noted at this point that the part 21 in extending completely around the upper end portion of the shank is engageable from any side of the hook when it is desirable to release the closure.

My present invention further provides what I will term an ejector or ejecting means, which operates to hold the part 21 up while the closure is open and to eject the closure from the body when the holding means is released. The ejector operates to start the closure away from the shank $a$ when the hook is being opened. The ejector may comprise a spring pressed member or plunger 26 suitably carried by the shank portion of the hook. In the drawings I have shown a plunger 25 comprising a head 28 operating in an opening 27 in the body and a bolt part 29 projecting from the head 28 through an opening 30 in the shank to engage the head 11 of the closure, or extend under part 21 as shown in Figs. 3 and 4 of the drawings. A spring 32 is arranged between the head 28 of the plunger and a plug 31 which closes the outer end of the opening 27 to normally yieldingly urge the bolt part 29 outwardly. The plunger is so mounted as to be in position to be engaged by the outer part of the head 11 when the closure is in the closed position and to project under the portion 24 of the part 21 to retain the part 21 up when the closure is open. In operation the bolt 29 forces or follows the head of the closure out, when the part 21 is moved upwardly to release the head, so that it passes under the portion 24 before the part 21 can be returned to its down position by the spring 23. When the closure is open the bolt remains projected under the portion 24 as shown in Fig. 4 to hold the part 21 up. As the closure is swung to the closed position it engages the end of the bolt as shown at 33 in Fig. 4 to depress the bolt against the resistance of the spring 27 until the parts reach the position shown in Fig. 3 at which time the part 21 is automatically moved downwardly by the spring 23 to retain the closure in the closed position. It will be obvious that an object arranged in the hook will move the trigger 16 to seated position in the load carrying part 50 of the hook and will thereby move the closure *b* to the closed position against the resistance of the spring 27 allowing the holding means *c* to automatically catch and thereafter retain the closure in the closed position.

From the foregoing description it will be apparent that the device is closed and secured automatically upon an object being arranged in the hook and that the hook is opened and released to allow the removal of an object therefrom by simply moving the part 21 upwardly to release the closure.

Having described only a typical preferred form of my invention I do not wish to limit myself to the specific details hereinabove set forth, but wish to reserve to myself any changes or variations that may appear to those skilled in the art or fall within the scope of the following claims.

Having described my invention, I claim:

1. In combination, a hook, a closure for the hook, a member carried by the hook to be movable to operative position where it holds the closure in closed position, and a spring actuated plunger operating to hold the member in an inoperative position when the closure is open.

2. A device including a hook, a closure for the hook, and means for interconnecting the closure and hook when the closure is in operating position, said means comprising a projection on the hook and a head on the closure having an opening through it to receive the projection.

3. In combination, a hook, a closure for the hook, means for locking the closure in closed position, and spring actuated plunger for ejecting the closure from the closed position upon release of the locking means.

In testimony whereof, I have signed my name to this specification.

JOHN BERGSTEN.